United States Patent
Akay et al.

(10) Patent No.: US 11,231,009 B2
(45) Date of Patent: Jan. 25, 2022

(54) SAFETY SYSTEM FOR AN AERODYNAMIC DEVICE OF A WIND TURBINE ROTOR BLADE

(71) Applicant: Siemens Gamesa Renewable Energy A/S, Brande (DK)

(72) Inventors: Busra Akay, Herning (DK); Peder Bay Enevoldsen, Vejle (DK); Alejandro Gomez Gonzalez, Aarhus (DK); Bodo Richert, Herning (DK)

(73) Assignee: Siemens Gamesa Renewable Energy A/S, Brande (DK)

( * ) Notice: Subject to any disclaimer, the term of this patent is extended or adjusted under 35 U.S.C. 154(b) by 100 days.

(21) Appl. No.: 16/490,984

(22) PCT Filed: Nov. 27, 2017

(86) PCT No.: PCT/EP2017/080465
§ 371 (c)(1),
(2) Date: Sep. 4, 2019

(87) PCT Pub. No.: WO2018/162100
PCT Pub. Date: Sep. 13, 2018

(65) Prior Publication Data
US 2020/0011292 A1    Jan. 9, 2020

(30) Foreign Application Priority Data
Mar. 7, 2017 (DE) .................. 10 2017 203 674.5

(51) Int. Cl.
*F03D 1/06* (2006.01)
*F03D 7/02* (2006.01)

(52) U.S. Cl.
CPC ......... *F03D 1/0675* (2013.01); *F03D 7/0232* (2013.01); *F05B 2240/31* (2013.01); *F05B 2270/605* (2013.01)

(58) Field of Classification Search
None
See application file for complete search history.

(56) References Cited

U.S. PATENT DOCUMENTS 4,715,782 A * 12/1987 Shimmel ............... F03D 7/0252
416/32
5,584,655 A * 12/1996 Deering ................ F03D 7/0224
416/31

(Continued)

FOREIGN PATENT DOCUMENTS

| CN | 1511231 A | 7/2004 |
|----|-----------|--------|
| CN | 1904353 A | 1/2007 |

(Continued)

OTHER PUBLICATIONS

International Search Report & Written Opinion dated Mar. 25, 2018 for Application No. PCT/EP2017/080465.

(Continued)

*Primary Examiner* — Michael Lebentritt
*Assistant Examiner* — Jason G Davis
(74) *Attorney, Agent, or Firm* — Schmeiser, Olsen & Watts, LLP

(57) ABSTRACT

A rotor blade of a wind turbine including an aerodynamic device which can be actuated pneumatically by the use of a pressure supply system is provided. The pressure supply system includes a pressurized air supply system, a pressurized air transmission system with pressure lines for transmitting the supplied pressurized air from the pressurized air supply system to the aerodynamic device, at least one pneumatic actuator for activating the aerodynamic device, and a safety system to protect the rotor blade from damages caused by overpressure in the pressurized air transmission system and/or the actuator. The safety system includes means for discharging pressurized air from the pressurized (Continued)

air transmission system and/or the actuator. Also provided is a wind turbine for generating electricity including at least one such rotor blade.

11 Claims, 5 Drawing Sheets

(56) References Cited

U.S. PATENT DOCUMENTS

| | | | |
|---|---|---|---|
| 6,139,268 A | 10/2000 | Murawski et al. | |
| 7,195,209 B2 | 3/2007 | Schievelbusch | |
| 7,204,674 B2* | 4/2007 | Wobben | F03D 1/0641 416/1 |
| 7,828,523 B2 | 11/2010 | Bonnet | |
| 8,020,806 B2 | 9/2011 | Hauber et al. | |
| 8,192,161 B2* | 6/2012 | Baker | F03D 1/0675 416/23 |
| 8,491,262 B2* | 7/2013 | McGrath | F03D 7/0264 416/1 |
| 9,279,412 B2* | 3/2016 | Greenblatt | H04L 65/105 |
| 2004/0105752 A1 | 6/2004 | Wobben | |
| 2007/0025859 A1 | 2/2007 | Jacobsen | |
| 2007/0128025 A1 | 6/2007 | Driver | |
| 2009/0074574 A1* | 3/2009 | Godsk | F03D 1/0641 416/41 |
| 2009/0097976 A1 | 4/2009 | Driver et al. | |
| 2011/0217167 A1* | 9/2011 | Hancock | F03D 1/0675 416/23 |
| 2012/0141271 A1* | 6/2012 | Southwick | F03D 7/0232 416/23 |
| 2013/0224024 A1* | 8/2013 | Chang | F03D 1/065 416/147 |
| 2015/0316025 A1 | 11/2015 | Enevoldsen et al. | |
| 2017/0284366 A1 | 10/2017 | Spitzner | |

FOREIGN PATENT DOCUMENTS

| | | |
|---|---|---|
| CN | 1982697 A | 6/2007 |
| CN | 101413478 A | 4/2009 |
| CN | 105065195 A | 11/2015 |
| EP | 1995455 A1 | 11/2008 |
| EP | 2778397 A1 | 9/2014 |
| EP | 2998572 B1 | 9/2016 |
| KR | 101434469 B1 | 8/2014 |
| WO | 02051730 A2 | 7/2002 |
| WO | WO 02051730 A2 | 7/2002 |
| WO | 2017025352 A1 | 2/2017 |
| WO | WO 2017025352 A1 | 2/2017 |

OTHER PUBLICATIONS

International Search Report dated Mar. 26, 2018 for Application No. PCT/EP2017/080465.

* cited by examiner

SAFETY SYSTEM FOR AN AERODYNAMIC DEVICE OF A WIND TURBINE ROTOR BLADE

CROSS-REFERENCE TO RELATED APPLICATIONS

This application claims priority to PCT Application No. PCT/EP2017/080465, having a filing date of Nov. 27, 2017, which is based on German Application No. 10 2017 203 674.5, having a filing date of Mar. 7, 2017, the entire contents both of which are hereby incorporated by reference.

FIELD OF TECHNOLOGY

The following relates to a safety system for a rotor blade of a wind turbine comprising an aerodynamic device which can be actuated pneumatically by the use of a pressure supply system. Furthermore, the following relates to a wind turbine for generating electricity comprising such a rotor blade with a safety system.

BACKGROUND

It is known to use aerodynamic devices for wind turbine rotor blades in order to influence the aerodynamic properties of the rotor blades. Examples of aerodynamic devices are flaps, slats or spoilers. These aerodynamic devices may increase the lift of the rotor blade for wind speeds below the rated wind speed of the wind turbine and/or may reduce the lift (and thus the load) of the rotor blade for wind speeds above the rated wind speed of the wind turbine. In this context, the rated wind speed of a wind turbine is referred to as the wind speed at which the wind turbine reaches its nominal output power. For industrial modern wind turbines the rated wind speed is regularly between eight and twelve meters per second.

Such aerodynamic devices may change the profile of the wind turbine rotor blade passively. This means that due to a smart and careful design of the aerodynamic device the change of the profile of the rotor blade is realized when a certain threshold value relating to a predetermined parameter, e.g. the wind speed or the wind pressure, is reached or exceeded.

Alternatively, aerodynamic devices may work actively. Examples of an actuation mechanism for activating an aerodynamic device is a pneumatic, mechanical, electrical or hydraulic mechanism. Advantages of an active actuation of the aerodynamic device is the greater versatility of the aerodynamic device. Furthermore, actively working aerodynamic devices can in principle be used more selectively as the activation of the aerodynamic device is not necessarily depending on reaching or exceeding a certain external parameters such as the wind pressure or wind speed. Instead, an actively working aerodynamic device may also be activated depending on other working conditions of the wind turbine or just "on demand" by a person controlling the wind turbine.

The particular use of a pneumatic actuator for activating or deactivating an aerodynamic device of a wind turbine rotor blade has not yet been investigated or described in detail so far.

SUMMARY

An aspect relates to a reliable pressure supply system for a rotor blade of a wind turbine, wherein the specific requirements and needs of a wind turbine are appropriately considered.

According to embodiments of the invention, there is provided a rotor blade of a wind turbine, wherein the rotor blade comprises an aerodynamic device which can be actuated pneumatically by the use of a pressure supply system. The pressure supply comprises a pressurized air supply system, a pressurized air transmission system with pressure lines for transmitting the supplied pressurized air from the pressurized air supply system to the aerodynamic device, at least one pneumatic actuator for activating the aerodynamic device, and a safety system to protect the rotor blade from damages caused by overpressure in the pressurized air transmission system and/or the actuator, wherein the safety system comprises means for discharging pressurized air from the pressurized air transmission system and/or the actuator.

The embodiments focus on pneumatically activated actuators. This means that the actuator is activated by a fluid, in particular a gas, which has a certain pressure ranging from very low pressure close to the technical vacuum up to overpressure far beyond the atmospheric pressure. Such an actuator may be realized as a pressure hose or a cavity. The typical behavior of the actuator, if pressurized air with a pressure above atmospheric pressure is guided into the actuator, is that the actuator becomes inflated and thus changes its configuration, i.e. its orientation and/or the shape of the aerodynamic device.

A similar or even the same effect could be achieved by sucking air out of the actuator such as it occurs if the pressure of the pressurized air supply system is lower than the pressure of the air which is present in the actuator.

The components which are needed for pneumatically activating such an aerodynamic device are comprised by a so-called pressure supply system. In particular, the pressure supply system comprises at least the pressurized air supply system, the pneumatic actuator and the pressurized air transmission system, e.g. pressure lines, for transmitting the supply pressurized air from the pressurized air supply system to the pneumatic actuator of the aerodynamic device.

A key aspect of embodiments of the present invention is that the rotor blade furthermore comprises a safety system for protecting the rotor blade from damages caused by overpressure in the pressure lines of the pressurized air transmission system or in the pneumatically activated actuator. This safety system comprises in particular means for discharging pressurized air from the pressurized air transmission system and/or the actuator.

Beneficially, the discharge of the pressurized air occurs relatively fast. A fast response, i.e. a fast discharge is preferred as damages of the rotor blade are thus minimized.

It is stressed that embodiments of the present invention do not rely on a natural equalization of the air pressure in the sense that any system in practice has the tendency to approach equilibrium regarding the pressure. In contrast, embodiments of the present invention have the idea to deliberately provide a safety system with means for discharging the pressurized air from the location where it would otherwise possibly cause damages.

The means for discharging the pressurized air could be actuated mechanically.

As an example, there could be a stiff, rod-like construction wherein the rod could extend along the length axis of the blade. At the root section of the blade or even in the hub of the wind turbine, the rod could be moved in order to, for example, open a valve. This mechanically actuated discharging means has the benefit of avoiding any electrical, pneumatic or hydraulic components within the wind turbine rotor blade. This is beneficial in terms of simplicity and also in terms of robustness against lightning strikes or other harmful external impact on the rotor blade.

Another interesting way to realize the means for discharging the pressurized air is an electrical activation. This could, for example, be realized by a solenoid valve. Such a solenoid valve is a common means in control and regulation devices. Here, by an electrical impulse, the safety system is activated. In practice, by the electrical impulse, a valve, for example, would open up and thus allow undesired overpressure in the system to escape rapidly. An advantage of such an electrical activation is its flexible and space-saving approach as only electrical cables need to be provided from the solenoid valve to the discharging means, such as the valve.

Another way of discharging the pressurized air and the activation thereof is a pneumatic activation. This could well cooperate with the pneumatically activated actuator, but if a pressure valve is for example used for the means of discharging the pressurized air, a control by a secondary pressure line would be preferable. The use of a secondary pressure line would be preferred because a separate system makes sense in the case that there is interruption, for example, from the main system.

In embodiments of the invention, the means for discharging pressurized air comprises a safety relief valve with a set pressure, wherein the safety relief valve opens if the pressure in the pressurized air transmission system and/or the actuator exceeds a predetermined value.

Such a safety relief valve could work without any mechanical, electrical or pneumatic activation. Such a safety relief valve could just passively open up if the pressure acting on the valve or acting on certain components of the pressure supply system exceeds a predetermined value. This has the advantage that it would work autonomously, i.e. also in the case that control over the pneumatic actuator is lost and an overpressure builds up in the system. Furthermore, no connecting means for realizing the mechanical, pneumatic or electrical activation is needed. As a drawback, it could be mentioned that less control possibilities are given, thus, that the safety relief valve only opens up at a predetermined value and cannot be selectively opened up "on demand".

In embodiments of the invention, the means for discharging pressurized air is located in the outer half, in particular in the outer third, even more particularly in the outer 10 percent of the rotor blade.

In this context, the outer half refers to the half of the rotor blade which is oriented away from the hub, i.e. away of the part where the rotor blade is attached to. The location of the means for discharging pressurized air in the outer half could be advantageous, in particular if the aerodynamic device with the pneumatic actuator is also located in the outer half of the rotor blade. The reason therefore is that due to the increased wind speeds in the outer half of the rotor blade, the impact of the provision of an aerodynamic device is usually increased if the aerodynamic device is installed and mounted in the outer half compared to the inner half of the rotor blade.

In embodiments of the invention, the pressurized air transmission system comprises pipes and/or tubes for transmitting the supplied pressurized air from the pressurized air supply system to the actuator.

Although advantageously the pipes and/or tubes are configured and designed strong enough to withstand certain pressures, such a safety system is not only designed for protecting the potentially more sensitive actuator, but also for protecting the pipes and/or tubes of the pressurized air transmission system. Note that damages to the pressurized air transmission system is usually as damaging and cost-intensive to repair as damages elsewhere in the pressure supply system.

In embodiments of the invention, the actuator comprises an inflatable hose and/or an inflatable cavity.

A hose is normally something which can be arranged relative flexible at the rotor blade and comprises an outer skin which is elastic to a certain degree, such that the hose can have an increased volume when it is inflated and a reduced volume when it is deflated. An alternative configuration would be the use of a cavity which is embedded in a relatively elastic and flexible material as well, such that the cavity can change its volume, as seen in a cross-sectional view.

In embodiments of the invention, the pressurized air is discharged from the pressure supply system automatically if a predetermined air pressure in the pressurized air transmission system and/or the actuator is reached.

This has the advantage that no dedicated control orders needs to be given in order to discharge the potentially damaging overpressure in the system. In contrast, the safety system works automatically and discharges the air in the pressure lines or the actuator when there is overpressure in the system.

Alternatively, the pressure in the pressurized air transmission system and/or the actuator is determined by a direct measurement and the pressurized air transmission system and/or the actuator.

In the context of an automatic discharge it is advantageous, and necessary, to provide some means of determining the actual pressure in the system. This could be achieved by the provision of a transducer such as a pressure gauge. A plurality of measurement devices might also be advantageous to provide.

In embodiments of the invention, the pressurized air is discharged from the pressure supply system automatically, if emission of electrical control signals emitted from a main controller of the wind turbine to the pressure supply system is interrupted.

This relates to the scenario that control over the aerodynamic device with the pneumatic actuator is lost and for ensuring that no damages are caused to the system, pressurized air is discharged and emitted from the system.

In embodiments of the invention, the rotor blade further comprises a further valve, which allows for a constant purging of air towards the atmosphere.

This is advantageous in order to avoid accumulation of dirt, moisture or any unwanted particles in the system. Also it may allow for a certain safety protective means because there is a constant flow of air out of the system. This further valve is normally closely related to the provision of an exhaust port in the pneumatic actuator.

Finally, embodiments of the invention are also directed towards a wind turbine for generating electricity comprising at least one rotor blade according to one of the embodiments described above.

BRIEF DESCRIPTION

Some of the embodiments will be described in detail, with references to the following Figures, wherein like designations denote like members, wherein.

DETAILED DESCRIPTION

Figure 1:
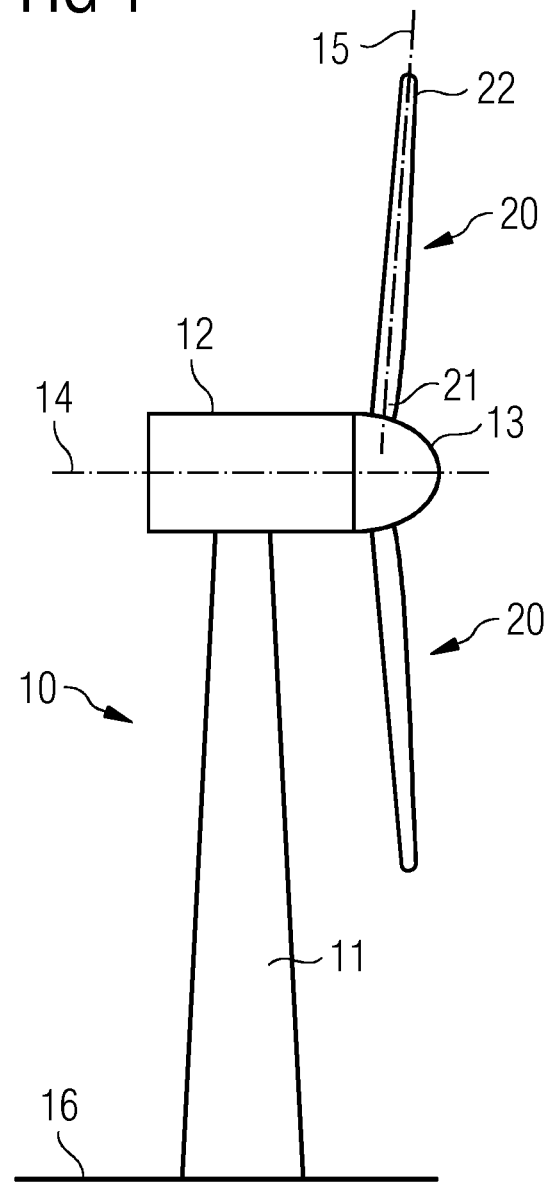
FIG. 1 shows a wind turbine.

FIG. 1 shows a conventional wind turbine 10 for generating electricity. The wind turbine 10 comprises a tower 11 which is mounted on a ground 16 by one end. At the other end of the tower 11, there is mounted a nacelle 12. The nacelle 12 is usually mounted rotatable with regard to the tower 11, which is referred to as comprising a yaw axis substantially perpendicular to the ground 16. The nacelle 12 usually accommodates the generator of the wind turbine and the gear box (if the wind turbine is a geared wind turbine). Furthermore, the wind turbine 10 comprises a hub 13 which is rotatable about a substantially horizontal rotor axis 14. The hub 13 is often described as being a part of the rotor, wherein the rotor is capable to transfer the rotational energy to the generator.

The hub 13 is the part at which the rotor blades 20 are mounted. The rotor blade 20 is usually mounted pivotable to the hub 13. In other words, the rotor blades 20 can be pitched about pitch axes 15, respectively. This improves the control of the wind turbine 10 and in particular of the rotor blades 20 by the possibility to modify the direction at which the wind is impinging on the rotor blades 20. Each rotor blade 20 is mounted to the hub 13 at its root section 21. The root section 21 is opposed to the tip section 22 of the rotor blade. Note that in the example as shown in FIG. 1, only two rotor blades 20 are depicted. However, most of the wind turbines nowadays comprise three rotor blades.

Figure 2:
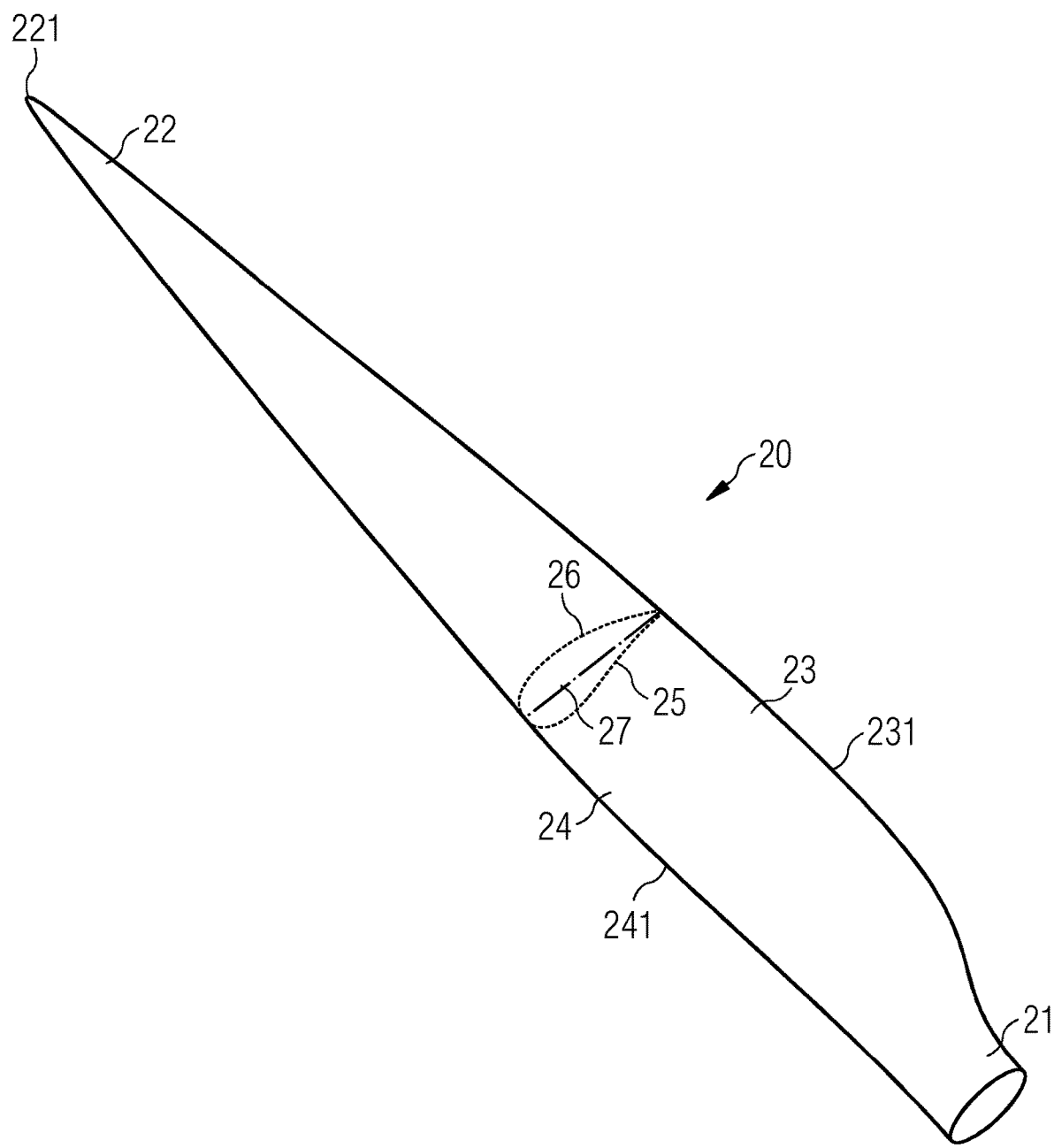
FIG. 2 shows a rotor blade of a wind turbine.

FIG. 2 shows such a rotor blade 20 of a wind turbine comprising a root section 21 and a tip section 22. Both sections, namely the root section 21 and the tip section 22, comprise up to ten percent in the spanwise direction of the rotor blade. The radially outmost point of the rotor blade is the so-called tip 221 of the rotor blade 20. The rotor blade 20 furthermore comprises a trailing edge 231 and a leading edge 241. The area around the trailing edge 231 is referred to as the trailing edge section 23; likewise, the area around the leading edge 241 is referred to as the leading edge section 24. The leading edge 241 typically has a curved and round shape, while the trailing edge 231 may have a sharp or blunt edge.

The straight line between the trailing edge 231 and the leading edge 241 is called the chord line 27, or simply the chord 27. The chord line 27 divides the airfoil into a pressure side 25 and a suction side 26. One of the airfoils is exemplarily shown in FIG. 2. It is to be understood that the rotor blade 20 comprises a plurality of airfoils—one next to the other—from the root section 21 to the tip section 22. These gradually changing airfoils cause the gradual change of the shape of the rotor blade. The airfoil has a lift generating shape in most of the sections of the rotor blade.

Figure 3:
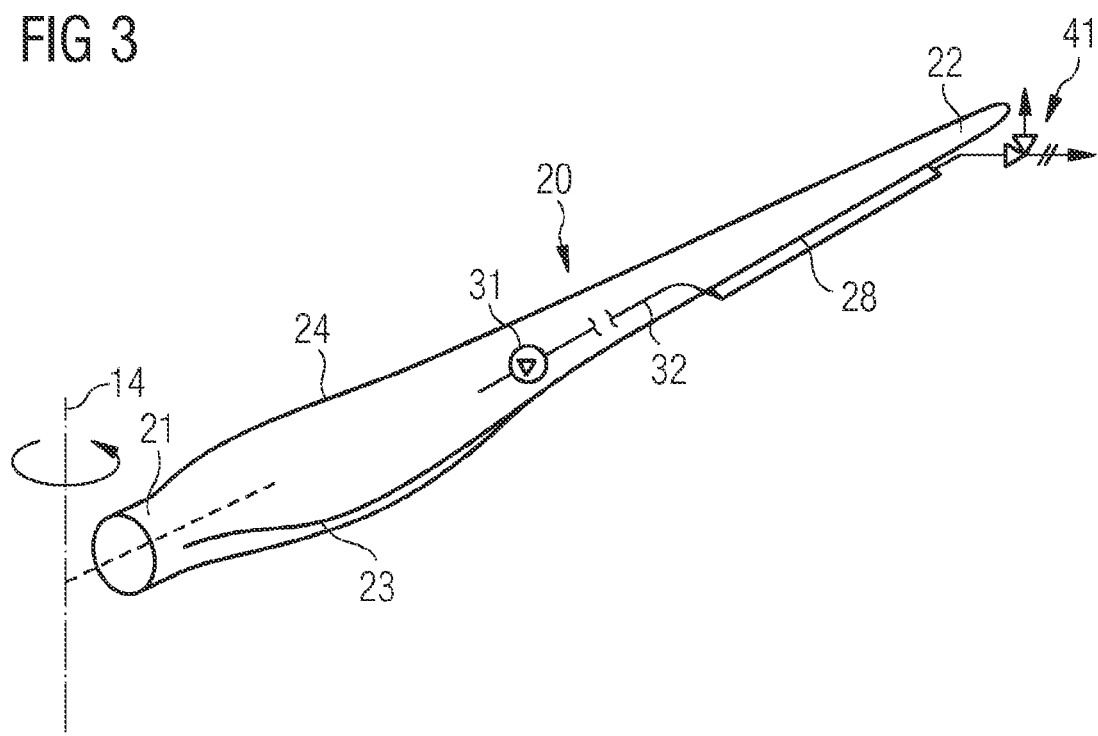
FIG. 3 shows a rotor blade with a pressure supply system and a safety relief valve.

FIG. 3 shows a rotor blade 20 of a wind turbine which comprises a root section 21 and a tip section 22. The rotor blade 20 comprises a flap at the trailing edge section 23 in the outboard half of the rotor blade. The flap can be activated actively by a pneumatic activation system. This pneumatic activation system basically comprises the pneumatic actuator which has been omitted for sake of clarity and simplicity in the illustration of FIG. 3.

In order to supply the pneumatic actuator with pressurized air, there is provided a pressurized air supply system 31 which is arranged for supplying the pneumatic actuator with pressurized air. This is realized and ensured by a pressurized air transmission system 32 which basically consists of pressure lines connecting the pressurized air supply system 31 with the aerodynamic device 28, in particular with the pneumatic actuator.

Note that the rotor blade also comprises a safety relief valve 41. The safety relief valve 41 is located at the outboard end of the aerodynamic device 28. The safety relief valve 41, which is illustrated with its schematic symbols used in the control and regulation environment may be designed as a pressure valve which opens up if a predetermined pressure value is reached or exceeded.

Figure 4:
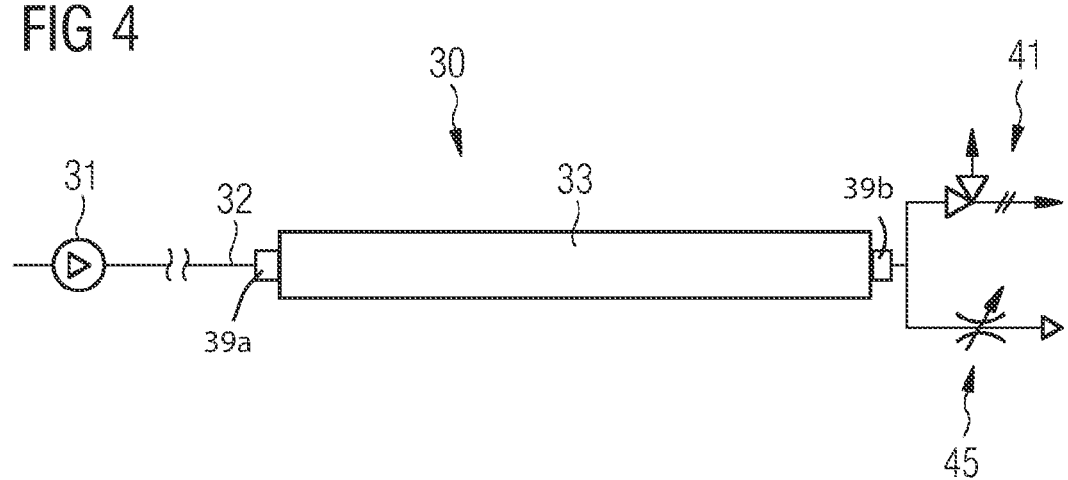
FIG. 4 shows a schematic overview of a pressure supply system with a safety relief valve and a further valve for purging.

FIG. 4 shows in a very schematic overview picture a pressure supply system comprising a pressurized air supply system 31, a pneumatic actuator 33 and a pressurized air transmission system 32 connecting the pressurized air supply system 31 with the pneumatic actuator 33. Furthermore, the actuator 33 is connected via further pressure lines with, firstly, a safety relief valve 41 and, secondly, with a further valve 45. The safety relief valve 41 may be designed similarly as described in connection with FIG. 3 above. The further valve 45 is destined for purging continuously air out of the actuator 33 and towards the atmosphere. This is done for allowing a constant flow of pressurized air through the actuator. The pressure in the pressurized air transmission system and/or the actuator is determined by a direct measurement and the pressurized air transmission system and/or the actuator. This could be achieved by the provision of a transducer such as a pressure gauge. A plurality of measurement devices 39a, 39b might also be advantageous to provide.

Figure 5:
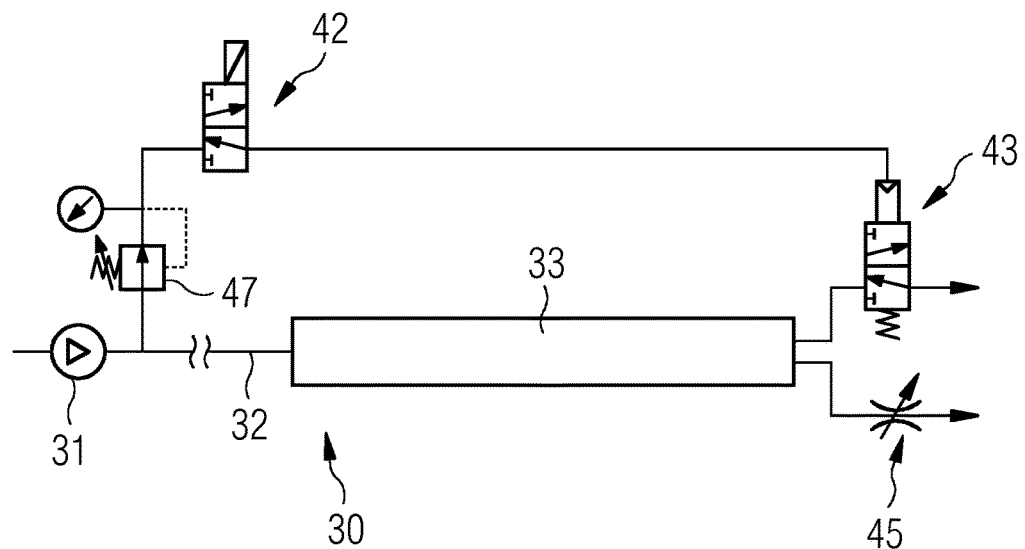
FIG. 5 shows a schematic overview of a pressure supply system with an electrically controlled means for discharging pressurized air.

FIG. 5 shows another embodiment of the invention. Again, it shows a pressure supply system 30 comprising a pressurized air supply system 31, a pressurized air transmission system 32 comprising pressure lines and a pneumatic actuator 33. Again, at the opposite end of the actuator 33, opposite to the end where the pressurized air supply system 31 is connected, a further valve 45 for purging air constantly and continuously towards the atmosphere is provided.

As safety mechanism here, a pilot control valve 43 controls the means for discharging pressurized air deliberately. The pilot control valve 43 is activated by a solenoid valve 42 which in the case of the present example in FIG. 5 located close to the pressurized air supply system 31. If the whole system is implemented in a rotor blade, the pressurized air supply system 31, which might be a simple compressor for example, and the solenoid valve 42 might be located at the root section 21 of the rotor blade or even in the hub 13 of the wind turbine.

Note that the present example as illustrated in FIG. 5, it is disclosed both a constant discharge of pressurized air via the further valve 45 and the possibility of an emergency discharge via the pilot control means for discharge. Thus, a fast emergency discharge and a constant flow to the atmosphere is ensured. Finally, FIG. 5 also discloses some regulators 47 for control and regulation of the system.

Figure 6:
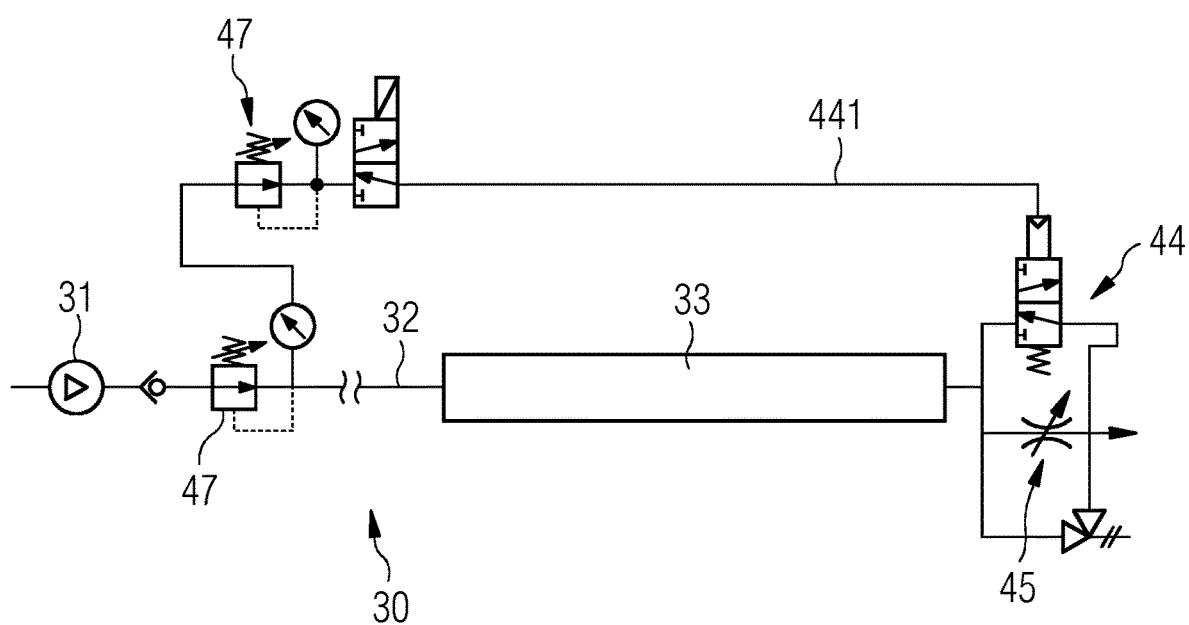
FIG. 6 shows a schematic view of a pressure supply system with a pneumatically controlled means for discharging pressurized air.

FIG. 6 shows yet another example of a pressure supply system 30 and accompanied safety mechanism. The pressure supply system 30 also comprises a pressurized air supply system 31, pressurized air transmission system 32, realized e.g. as pressure lines, and a pneumatic actuator 33. The basic difference between the embodiments in FIG. 5 and FIG. 6 is that the safety mechanism in terms of the means for discharging pressurized air is controlled via a solenoid valve 42, i.e. electrically, in the embodiment as illustrated in FIG. 5, while in the embodiment as illustrated in FIG. 6, the means is controlled and activated by a secondary pressure line 441 which feeds a pressure valve 44. Again, diverse regulators 47 are present in the system.

Note that all the shown embodiments may be designed such that they work automatically. They might also, in addition or alternatively to the automatic activation, be controlled selectively "on demand" of a user.

Figure 7:
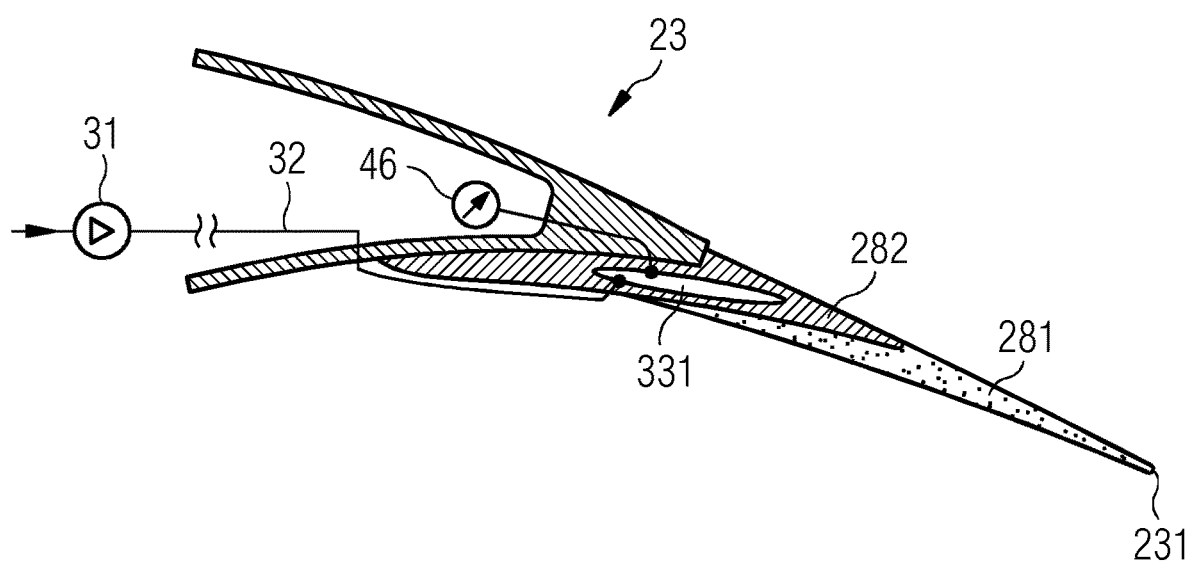
FIG. 7 shows an example of a pneumatic actuator realized as a cavity in a trailing edge flap.

Finally, FIG. 7 discloses an example of a pneumatic actuator. This example comprises a cavity 331 which is embedded in a flexible and elastic trailing edge flap. The trailing edge flap is comprised by a flap 281 and an adapter 282. In the embodiment as illustrated in FIG. 7, the cavity 331 is embedded in the adapter 282. This has the advantage that the flap 281 can be customized and can be upgraded or exchanged easily while the adapter 282 with the pneumatic actuator with the cavity 331 can remain unchanged. The adaptor 282 is attached to the pressure side 25 of the rotor blade in the trailing edge section 23 of the rotor blade.

Note that the cavity 331 is fed with pressurized air by pressure lines which are connected with a pressurized air supply system 31. As an additional feature, FIG. 7 shows a pressure gauge 46 which is able to measure the actual pressure in the cavity 331. This is useful for an efficient and reliable control of the pneumatic actuator.

Although the invention has been illustrated and described in greater detail with reference to the preferred exemplary embodiment, the invention is not limited to the examples disclosed, and further variations can be inferred by a person skilled in the art, without departing from the scope of protection of the invention.

For the sake of clarity, it is to be understood that the use of "a" or "an" throughout this application does not exclude a plurality, and "comprising" does not exclude other steps or elements.

The invention claimed is:

1. A rotor blade of a wind turbine comprising:
an aerodynamic device which can be actuated pneumatically by a use of a pressure supply system, wherein the pressure supply system comprises:
a pressurized air supply system;
a pressurized air transmission system with pressure lines for transmitting the supplied pressurized air from the pressurized air supply system to the aerodynamic device;
at least one pneumatic actuator for activating the aerodynamic device; and
a safety system to protect the rotor blade from damages caused by overpressure in the pressurized air transmission system and/or the actuator, wherein the safety system is configured to selectively discharge pressurized air from the pressurized air transmission system and/or the actuator;
wherein air is continuously purged out of the at least one pneumatic actuator and towards an atmosphere to allow a constant flow of pressurized air through the at least one pneumatic actuator.

2. The rotor blade according to claim 1, wherein the pressurized air is discharged electrically by a solenoid valve.

3. The rotor blade according to claim 1, wherein the pressurized air is discharged pneumatically.

4. The rotor blade according to claim 3, wherein the safety system includes a pressure valve, which is controlled by a secondary pressure line.

5. The rotor blade according to claim 1, wherein the safety system includes a safety relief valve with a set pressure, wherein the safety relief valve opens if the pressure in the pressurized air transmission system and/or the actuator exceeds a predetermined value.

6. The rotor blade according to claim 1, wherein the safety system is located in at least one of an outer half, an outer third, and an outer 10% of the rotor blade.

7. The rotor blade according to claim 1, wherein the at least one pneumatic actuator comprises an inflatable hose and/or an inflatable cavity.

8. The rotor blade according to claim 1, wherein the pressurized air is discharged from the pressure supply system automatically if a pre-determined air pressure in the pressurized air transmission system and/or the actuator is reached.

9. The rotor blade according to claim 8, wherein the pressure in the pressurized air transmission system and/or the actuator is directly measured at the pressurized air transmission system and/or the actuator.

10. A wind turbine generating electricity comprising at least one rotor blade according to claim 1.

11. The rotor blade according to claim 1, wherein the aerodynamic device is located closer to a tip section of the rotor blade than a root section of the rotor blade.

* * * * *